(12) United States Patent
Lin

(10) Patent No.: US 10,479,265 B2
(45) Date of Patent: Nov. 19, 2019

(54) AUXILIARY BRAKE LIGHT SYSTEM FOR VEHICLE

(71) Applicant: Wei-Tai Lin, Taipei (TW)

(72) Inventor: Wei-Tai Lin, Taipei (TW)

( * ) Notice: Subject to any disclaimer, the term of this patent is extended or adjusted under 35 U.S.C. 154(b) by 92 days.

(21) Appl. No.: 15/815,290

(22) Filed: Nov. 16, 2017

(65) Prior Publication Data

US 2019/0143886 A1    May 16, 2019

(51) Int. Cl.
*B60Q 1/26* (2006.01)
*B60Q 1/30* (2006.01)
*B60Q 1/44* (2006.01)

(52) U.S. Cl.
CPC ......... *B60Q 1/2607* (2013.01); *B60Q 1/2619* (2013.01); *B60Q 1/2696* (2013.01); *B60Q 1/302* (2013.01); *B60Q 1/44* (2013.01)

(58) Field of Classification Search
CPC .. B60Q 1/2607; B60Q 1/2619; B60Q 1/2696; B60Q 1/302; B60Q 1/44
See application file for complete search history.

(56) References Cited

U.S. PATENT DOCUMENTS 7,722,106 B2 * 5/2010 Bunsmann ............. B60J 1/1861
                                                          296/50
2017/0355303 A1 * 12/2017 Reyes ................... B60Q 1/503

* cited by examiner

*Primary Examiner* — Sonji N Johnson
(74) *Attorney, Agent, or Firm* — R. Lynette Wylie; Apex Juris, PLLC.

(57) ABSTRACT

An auxiliary brake light system has a middle light bar, a left light module, and a right light module for being mounted on a back of the vehicle. The left light module has a right part extending upwards and a left part. The right light module has a left part extending upwards and a right part. The middle light bar is above the left light module and the right light module and has a left part extending downwards and a right part extending downwards. The left part of the middle light bar and the right part of the left light module are separated from each other and opposite to each other. The right part of the middle light bar and the left part of the right light module are separated from each other and opposite to each other.

6 Claims, 9 Drawing Sheets

AUXILIARY BRAKE LIGHT SYSTEM FOR VEHICLE

BACKGROUND OF THE INVENTION

1. Field of the Invention

The present invention relates to an auxiliary brake light system, and more particularly to an auxiliary brake light system for a vehicle.

2. Description of Related Art

Traffic accidents result from different reasons. Rear-end collision is a kind of traffic accident. When rear-end collision happens, the vehicles would be damaged, and even the driver and the passengers may be injured or killed.

For example, in a traffic jam, cars may be alternately and frequently braked and move, causing the brake lights of the cars to seem like flashing. A driver driving a vehicle behind a front car and looking at the flashing brake light may lose attention on the road due to eye fatigue. As a result, when the front car suddenly stops, the driver behind the front car may not immediately react to stop the vehicle and then the vehicle may hit the front car. Besides, when the car speed is very fast, rear-end collision may also occur. For example, when a driver drives a vehicle fast and observes that a front car suddenly stops, a reaction time for the driver is too short to stop the vehicle. As a result, the vehicle behind the front car may hit the front car to cause the rear-end collision. In addition, at night, the brake light and the tail light of some cars may be lighted up at the same time, and the tail light of some cars may not be lighted up. For a driver behind the cars, the driver may see several lights, including braking lights and tail lights. When the driver looks at the several lights of the cars over a long period of time, the driver may feel strained on the eyes and fails to distinguish between the brake lights and the tail lights. As a result, the driver may fail to concentrate on the road and suddenly stop the vehicle, such that a car behind the driver may hit the driver's vehicle to cause rear-end collision.

As mentioned above, the traffic accidents may be highly correlated with the conventional brake light. The conventional brake light includes a left brake lamp and a right brake lamp. When the conventional brake light is lighted up, the left brake lamp and the right brake lamp may just show two separated light spots that may not effectively attract the driver's attention. The conventional brake light should be improved.

SUMMARY OF THE INVENTION

An objective of the present invention is to provide an auxiliary brake light system that is different from the conventional brake light to effectively attract the driver's attention.

The auxiliary brake light system for a vehicle of the present invention comprises a middle light bar, a left light module, and a right light module. The left light module is for being mounted on a back of the vehicle and has a right part extending upwards and a left part. The right light module is for being mounted on the back of the vehicle and has a left part extending upwards and a right part. The middle light bar is for being mounted on the back of the vehicle above the left light module and the right light module and has a left part extending downwards and a right part extending downwards. The left part of the middle light bar and the right part of the left light module are separated from each other and opposite to each other. The right part of the middle light bar and the left part of the right light module are separated from each other and opposite to each other.

The middle light bar, the left light module, and the right light module are lighted up at a same time to seem like a continuous light pattern. Compared with the conventional brake light that may just show separated light spots, the continuous light pattern shown by the present invention may effectively attract a person's attention to avoid a traffic accident.

DETAILED DESCRIPTION OF THE PREFERRED EMBODIMENT

An auxiliary brake light system for a vehicle of the present invention comprises a middle light bar, a left light module, and a right light module. The vehicle may be, but not limited to, a sport utility vehicle (SUV) or a sedan. The middle light bar, the left light module, and the right light module are for being mounted on a back of the vehicle. The middle light bar is above the left light module and the right light module. The left light module and the right light module may be mounted at a same height.

For example, the back of the vehicle includes a rear-window and a tail. The middle light bar is for being mounted on the rear window of the vehicle. The left light module and the right light module are for being mounted on the tail of the vehicle, wherein the left light module is mounted at a left of the tail and the right light module is mounted at a right of the tail. It is to be understood that the left light module and the right light module each respectively may comprise multiple separated segments to be mounted on a tailgate and a tail body of the tail of the vehicle, such that the left light module and the right light module may not affect the tailgate to be opened or closed. The middle light bar, the left light module, and the right light module respectively have multiple light emitting diodes (LEDs) that are arranged in series.

The LEDs may be electrically connected to an electronic control unit (ECU) of the vehicle, and thereby the LEDs are controllable by the ECU.

Hence, the ECU may activate the middle light bar, the left light module, and the right light module when the ECU detects a brake pedal of the vehicle is pressed. The middle light bar, the left light module, and the right light module are lighted up at a same time to seem like a continuous light pattern for a person who is looking at the middle light bar, the left light module, and the right light module.

Figure 1A:
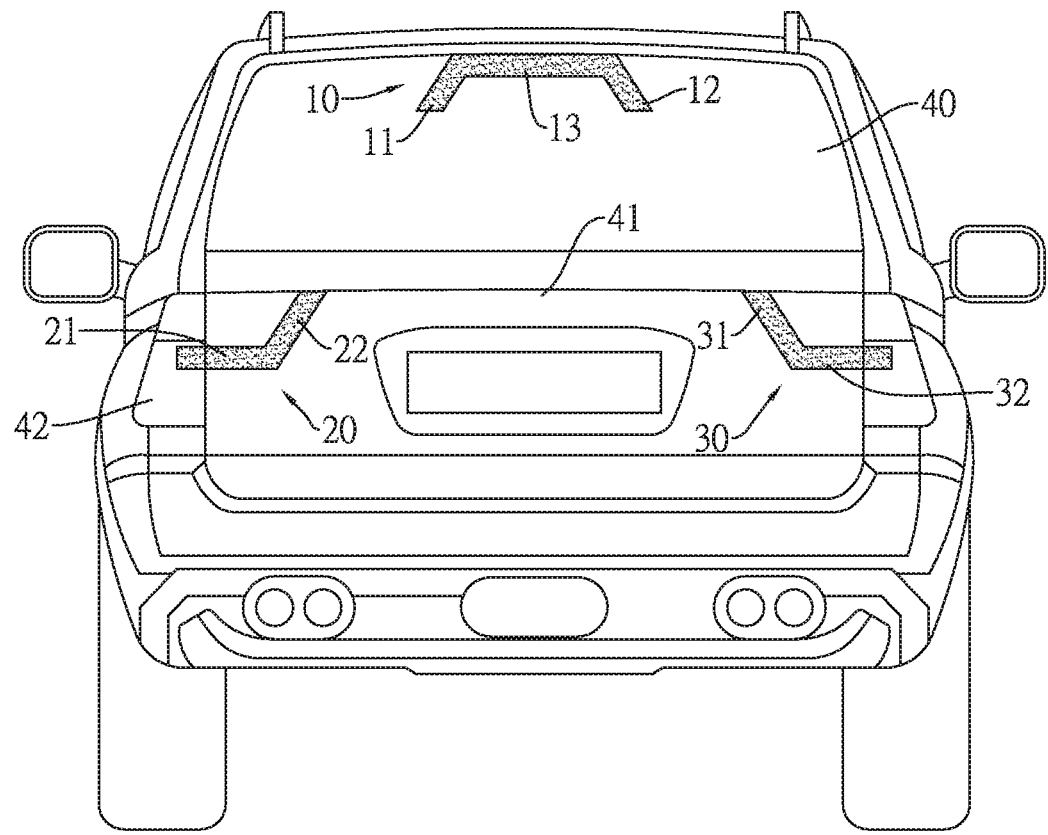
FIG. 1A is a plane view of a first embodiment of the present invention mounted on a back of a sport utility vehicle (SUV)

FIG. 1A discloses a first embodiment of the present invention that is mounted on a back of an SUV. The middle light bar 10 is mounted on a top of the rear window 40. The middle light bar 10 comprises a left part 11, a right part 12, and a middle part 13. The middle part 13 is connected between a top of the left part 11 and a top of the right part 12. The middle part 13 may be parallel to a horizontal plane. The left part 11 and the right part 12 extend downwards. The left light module 20 comprises a left part 21 and a right part 22. The left part 21 is connected to a bottom of the right part 22 and parallel to the middle part 13 of the middle light bar 10. The left part 21 may comprise two separated segments to be mounted on the tailgate 41 and the tail body 42. The right part 22 may be mounted on the tailgate 41 and extends upwards. The right light module 30 comprises a left part 31 and a right part 32. The left part 21 of the left light module 20 and the right part 32 of the right light module 30 may be mounted at a same height. The left part 31 of the right light module 30 may be mounted on the tailgate 41 and extends upwards. The right part 32 is connected to a bottom of the left part 31 and parallel to the middle part 13 of the middle light bar 10. The right part 32 may comprise two separated segments to be mounted on the tailgate 41 and the tail body 42. The left part 11 of the middle light bar 10 inclines straight to the right part 22 of the left light module 20. The right part 12 of the middle light bar 10 inclines straight to the left part 31 of the right light module 30. A slope of the left part 11 is opposite to a slope of the right part 12 of the middle light bar 10. The left part 11 of the middle light bar 10 and the right part 22 of the left light module 20 are separated from each other and opposite to each other. The left part 11 of the middle light bar 10 and the right part 22 of the left light module 20 are disposed along a same straight line. The right part 12 of the middle light bar 10 and the left part 31 of the right light module 30 are separated from each other and opposite to each other. The right part 12 of the middle light bar 10 and the left part 31 of the right light module 30 are disposed along a same straight line.

Figure 1B:
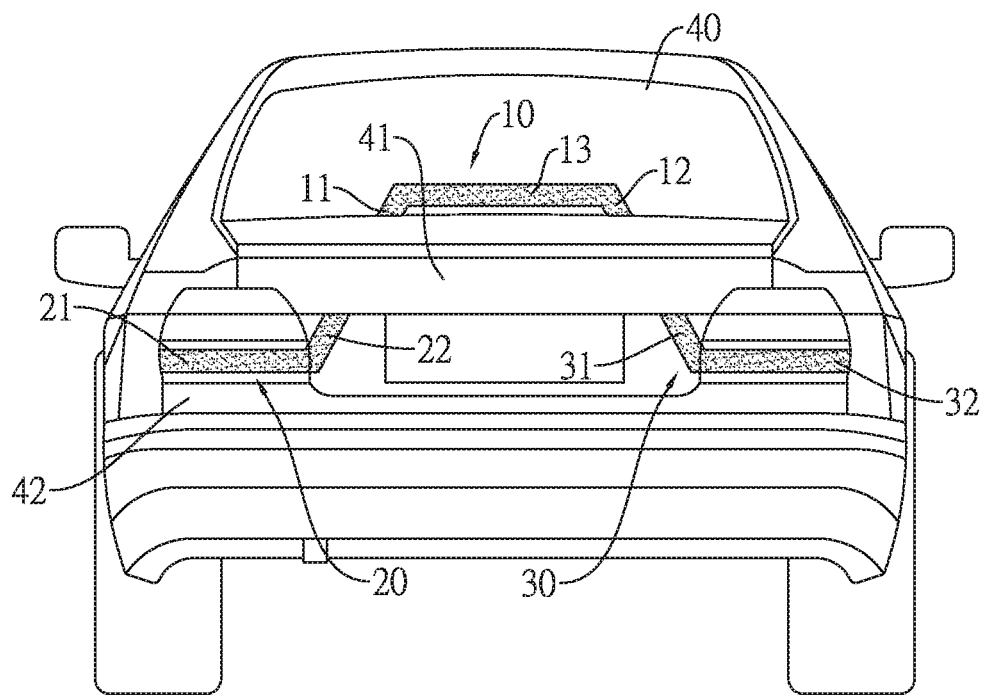
FIG. 1B is a plane view of the first embodiment of the present invention mounted on a back of a sedan.

FIG. 1B discloses the first embodiment of the present invention that is mounted on a back of a sedan. The middle light bar 10 may be mounted on a bottom of the rear window 40.

Figure 2A:
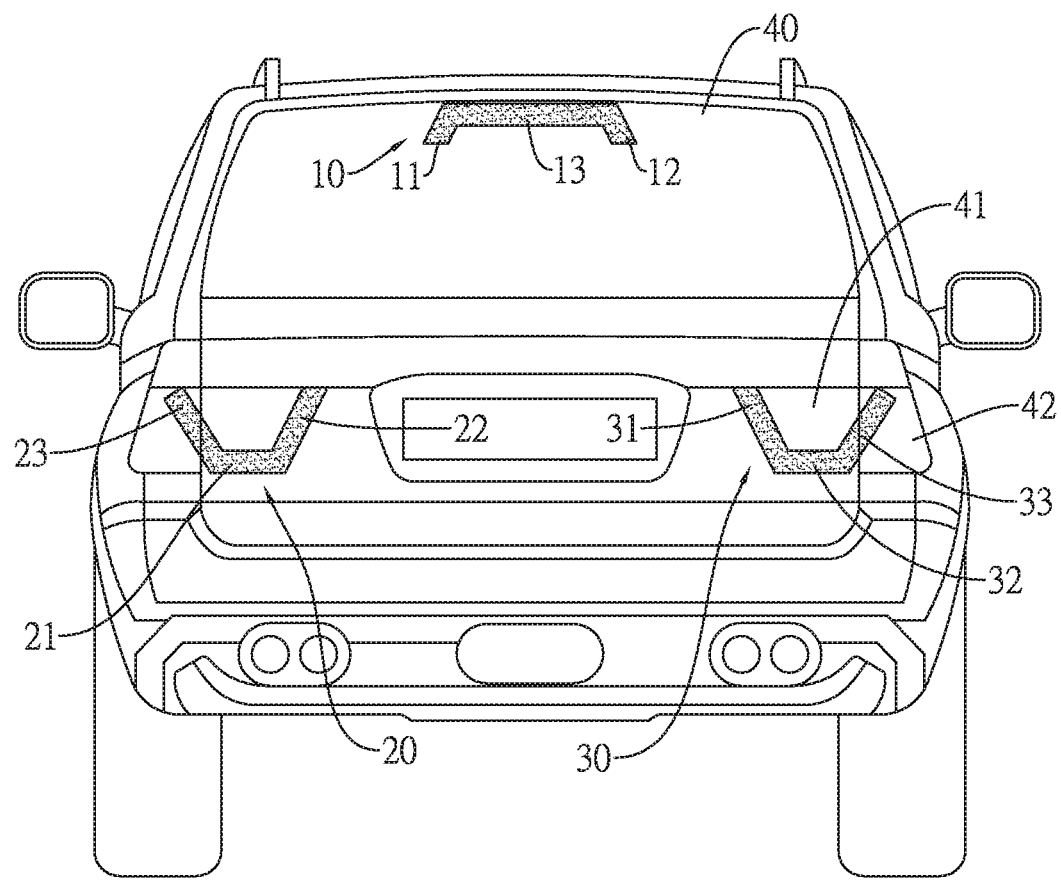
FIG. 2A is a plane view of a second embodiment of the present invention mounted on a back of a sport utility vehicle (SUV)

FIG. 2A discloses a second embodiment of the present invention that is mounted on a back of an SUV. The middle light bar 10 is mounted on the top of the rear window 40. Compared with the first embodiment, the left light module 20 in the second embodiment further comprises a third part 23. The left part 21 of the left light module 20 has a left terminal and a right terminal that are respectively connected to a bottom of the third part 23 and the bottom of the right part 22. The third part 23 extends straight and upwards. A slope of the third part 23 is opposite to a slope of the right part 22 of the left light module 20. The left part 21 and the right part 22 of the left light module 20 may be mounted on the tailgate 41. The third part 23 may comprise two separated segments to be mounted on the tailgate 41 and the tail body 42. Similarly, compared with the first embodiment, the right light module 30 in the second embodiment further comprises a third part 33. The right part 32 of the right light module 30 has a right terminal and a left terminal that are respectively connected to a bottom of the third part 33 and the bottom of the left part 31. The third part 33 extends straight and upwards. A slope of the third part 33 is opposite to a slope of the left part 31 of the right light module 30. The left part 31 and the right part 32 of the right light module 30 may be mounted on the tailgate 41. The third part 33 may comprise two separated segments to be mounted on the tailgate 41 and the tail body 42.

Figure 2B:
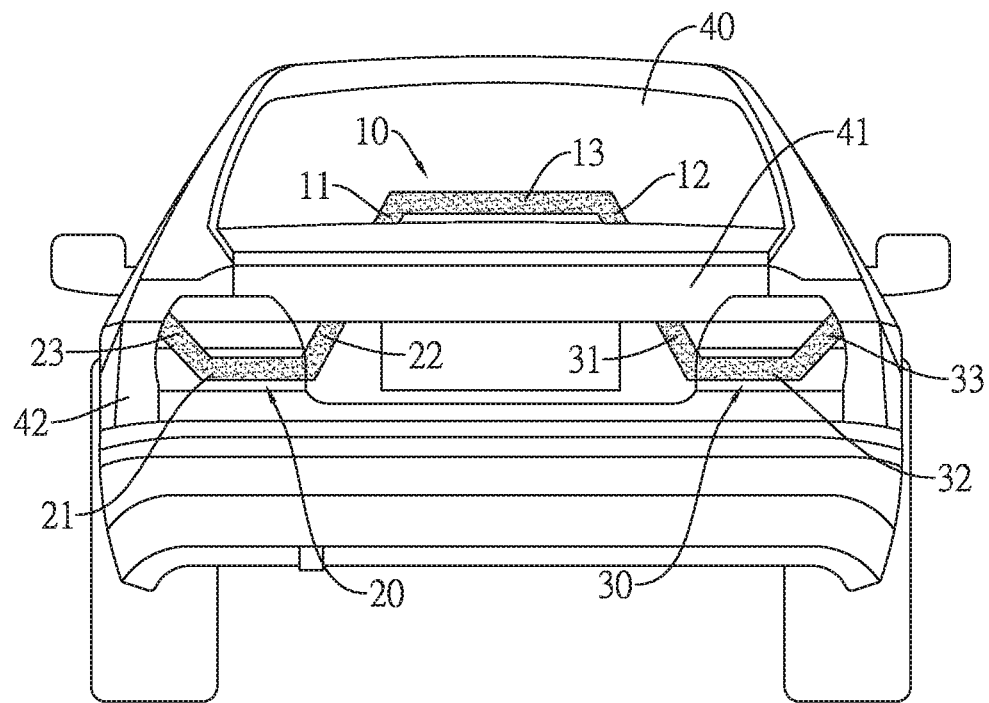
FIG. 2B is a plane view of the second embodiment of the present invention mounted on a back of a sedan.

FIG. 2B discloses the second embodiment of the present invention that is mounted on a back of a sedan. The middle light bar 10 is mounted on a bottom of the rear window 40. The right part 22 of the left light module 20 and the left part 31 of the right light module 30 are mounted on the tailgate 41. The left part 22 and the third part 23 of the left light module 20 and the right part 32 and the third part 33 of the right light module 30 are mounted on the tail body 41.

Compared with the first embodiment, the second embodiment has a larger light pattern.

Figure 3A:
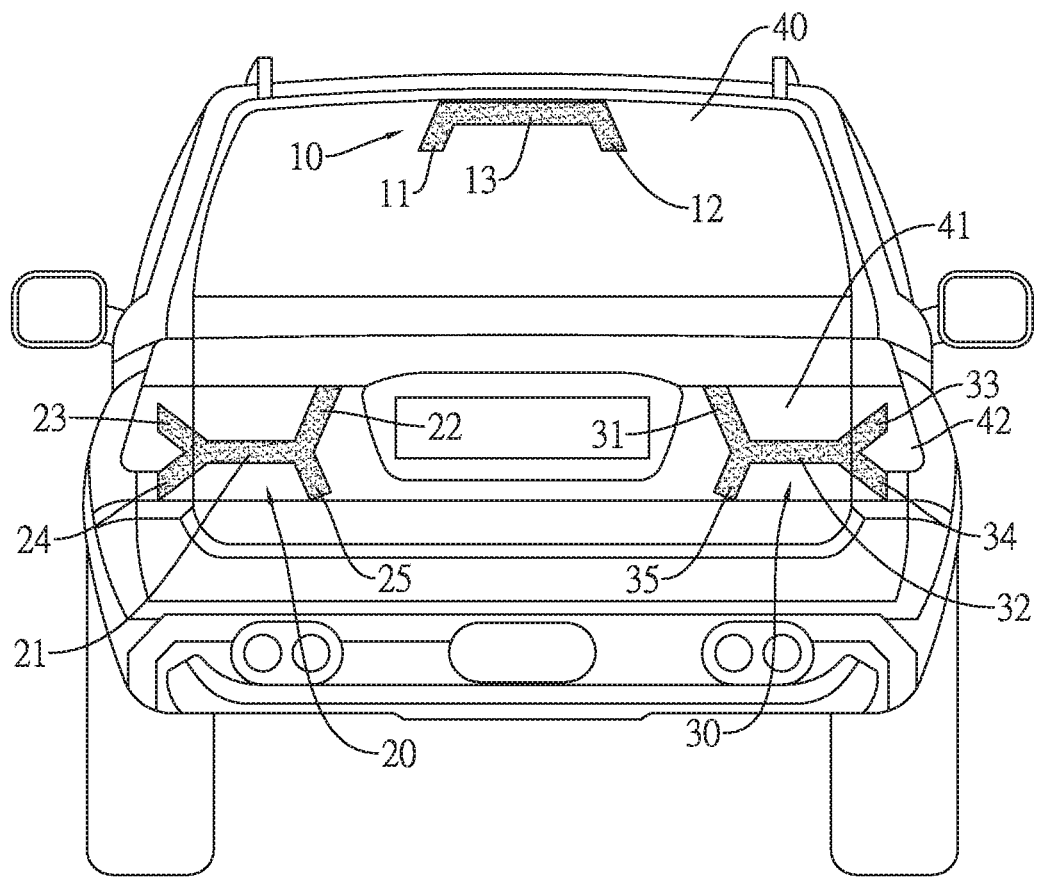
FIG. 3A is a plane view of a third embodiment of the present invention mounted on a back of a sport utility vehicle (SUV)

FIG. 3A discloses a third embodiment of the present invention that is mounted on a back of an SUV. The middle light bar 10 is mounted on the top of the rear window 40. Compared with the second embodiment, the left light module 20 in the third embodiment further comprises a fourth part 24 and a fifth part 25. The left terminal and the right terminal of the left part 21 are respectively connected to a top of the fourth part 24 and a top of the fifth part 25. The fourth part 24 and the fifth part 25 extend straight and downwards. A slope of the fourth part 24 is opposite to the slope of the third part 23 of the left light module 20. A slope of the fifth part 25 is opposite to the slope of the right part 22 of the left light module 20. The right part 22, the left part 21, and the fifth part 25 of the left light module 20 are mounted on the tailgate 41. The third part 23 and the fourth part 24 of the left light module 20 may comprise multiple separated segments to be mounted on the tailgate 41 and the tail body 42. Similarly, compared with the second embodiment, the right light module 30 in the third embodiment further comprises a fourth part 34 and a fifth part 35. The right terminal and the left terminal of the right part 32 are respectively connected to a top of the fourth part 34 and a top of the fifth part 35. The fourth part 34 and the fifth part 35 extend straight and downwards. A slope of the fourth part 34 is opposite to the slope of the third part 33 of the right light module 30. A slope of the fifth part 35 is opposite to the slope of the left part 31 of the right light module 30. The right part 32, the left part 31, and the fifth part 35 of the right light module 30 are mounted on the tailgate 41. The third part 33 and the fourth part 34 of the right light module 30 may comprise multiple separated segments to be mounted on the tailgate 41 and the tail body 42.

Figure 3B:
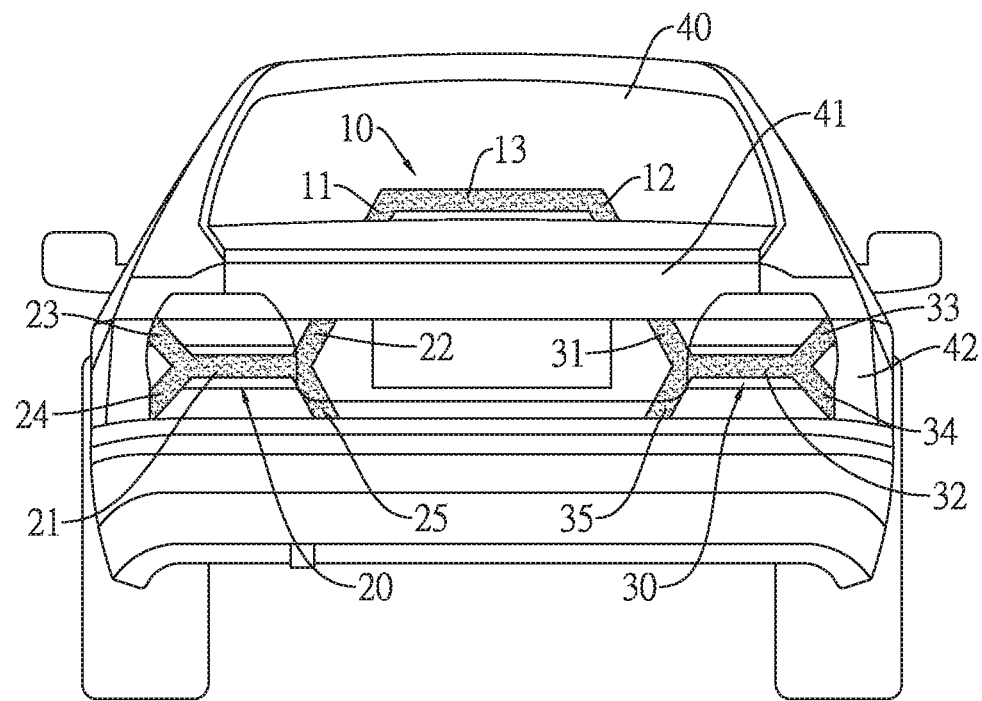
FIG. 3B is a plane view of the third embodiment of the present invention mounted on a back of a sedan.

FIG. 3B discloses the second embodiment of the present invention that is mounted on a back of a sedan. The middle light bar 10 is mounted on a bottom of the rear window 40. The right part 22 of the left light module 20 and the left part 31 of the right light module 30 are mounted on the tailgate 41. The left part 21, the third part 23, and the fourth part 24 of the left light module 20 and the right part 32, the third part 33, and the fourth part 34 of the right light module 30 are mounted on the tail body 42. The fifth part 25 of the left light module 20 and the fifth part 35 of the right light module 30 may comprise multiple separated segments to be mounted on the tailgate 41 and the tail body 42.

Compared with the first embodiment and the second embodiment, the third embodiment has a larger light pattern.

Figure 4A:
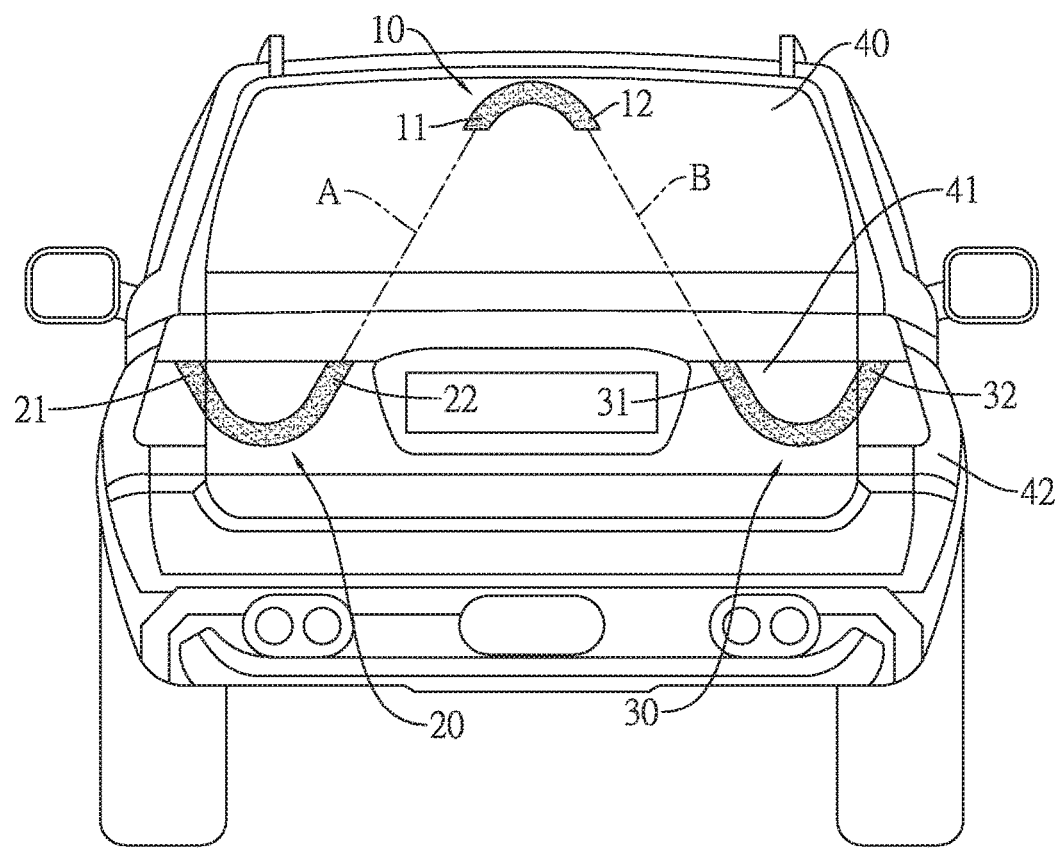
FIG. 4A is a plane view of a fourth embodiment of the present invention mounted on a back of a sport utility vehicle (SUV)

FIG. 4A discloses a fourth embodiment of the present invention that is mounted on a back of an SUV. The middle light bar 10 is mounted on the top of the rear window 40. The middle light bar 10 is a curved light bar having the left part 11 and the right part 12 that extent downwards. The left light module 20 is a curved light bar having the left part 21 and the right part 22. The left part 21 and the right part 22 of the left light module 20 extend upwards. Similarly, the right light module 30 is a curved light bar having the left part 31 and the right part 32. The left part 31 and the right part 32 of the right light module 30 extend upwards. The left part 11 of the middle light bar 10 and the right part 22 of the left light module 20 are separated from each other and opposite to each other along a first straight line A. The right part 12 of the middle light bar 10 and the left part 31 of the right light module 30 are separated from each other and opposite to each other along a second straight line B. A slope of the first straight line A is opposite to a slope of the second straight line B. The right part 22 of the left light module 20 and the left part 31 of the right light module 30 may be mounted on the tailgate 41. The left part 21 of the left light module 20 and the right part 32 of the right light module 30 may comprise multiple separated segments to be mounted on the tailgate 41 and the tail body 42.

Figure 4B:
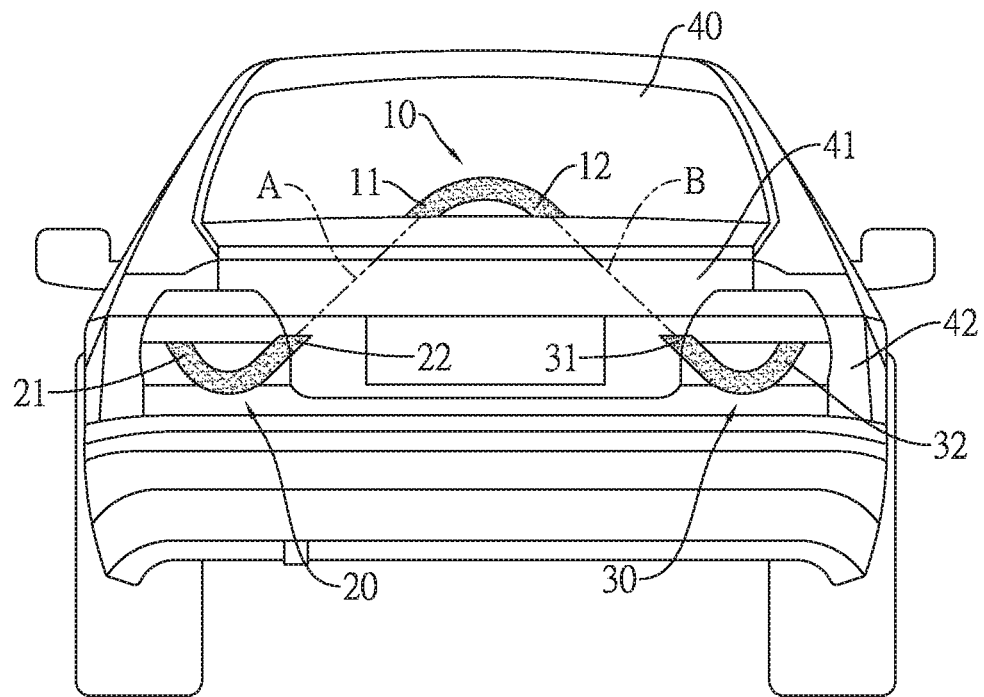
FIG. 4B is a plane view of the fourth embodiment of the present invention mounted on a back of a sedan.

FIG. 4B discloses the fourth embodiment of the present invention that is mounted on a back of a sedan. The middle light bar 10 is mounted on a bottom of the rear window 40. The left part 22 of the left light module 20 and the right part 31 of the right light module 30 are mounted on the tail body 42. The right part 22 of the left light module 20 and the left part 31 of the right light module 30 may comprise multiple separated segments to be mounted on the tailgate 41 and the tail body 42.

Figure 5:
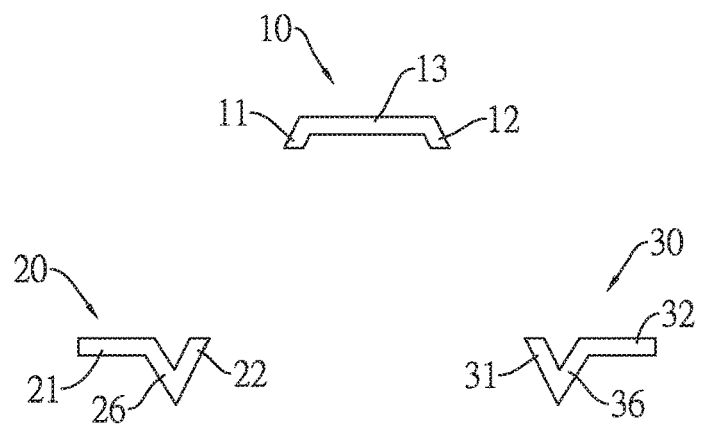
FIG. 5 is a plane view of a fifth embodiment of the present invention.

FIG. 5 discloses a fifth embodiment of the present invention. The middle light bar 10 in the fifth embodiment may be referred to the middle light bar in the first to third embodiments. Compared with the first embodiment, the left light module 20 in the fifth embodiment further comprises a middle part 26. The middle part 26 has a left terminal and a right terminal that are respectively connected to a right terminal of the left part 21 and the bottom of the right part 22. A slope of the middle part 26 is opposite to the slope of the right part 22. Similarly, compared with the first embodiment, the right light module 30 in the fifth embodiment further comprises a middle part 36. The middle part 36 has a left terminal and a right terminal that are respectively connected to the bottom of the left part 31 and a left terminal of the right part 32. A slope of the middle part 36 is opposite to the slope of the left part 31.

Figure 6:
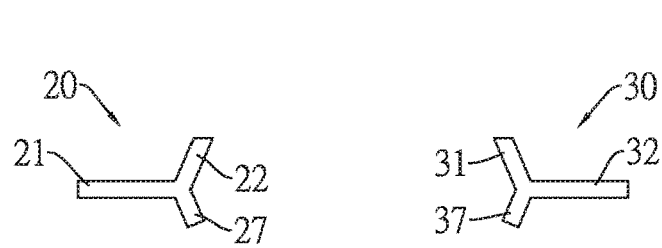
FIG. 6 is a plane view of a sixth embodiment of the present invention.

FIG. 6 discloses a sixth embodiment of the present invention. The middle light bar 10 in the sixth embodiment may be referred to the middle light bar in the first to third embodiments. Compared with the first embodiment, the left light module 20 in the sixth embodiment further comprises a seventh part 27. A top of the seventh part 27 is connected to a right terminal of the left part 21. The seventh part 27 extends downwards. A slope of the seventh part 27 is opposite to the slope of the right part 22. Similarly, compared with the first embodiment, the right light module 30 in the sixth embodiment further comprises a seventh part 37. A top of the seventh part 37 is connected to a left terminal of the right part 32. The seventh part 37 extends downwards. A slope of the seventh part 37 is opposite to the slope of the left part 31.

Figure 7:
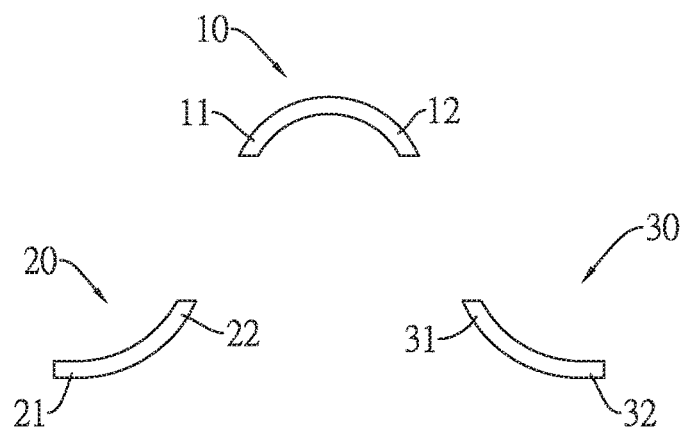
FIG. 7 is a plane view of a seventh embodiment of the present invention.

FIG. 7 discloses a seventh embodiment of the present invention. The middle light bar 10 in the seventh embodiment may be referred to the middle light bar in the fourth embodiment. The right part 22 of the left light module 20 and the left part 31 of the right light module 30 extend upwards. Compared with the fourth embodiment, a left terminal of the left part 21 of the left light module 20 extends laterally. A right terminal of the right part 32 of the right light module 30 extends laterally.

In conclusion, when a driver presses the brake pedal of the vehicle, the middle light bar 10, the left light module 20, and the right light module 30 are lighted up. When a person is looking at the middle light bar 10, the left light module 20, and the right light module 30, the middle light bar 10 seems connected between the left light module 20 and the right light module 30 to display a continuous light pattern. The person who is looking at the continuous light pattern may pay more attention on the road to avoid traffic accident.

What is claimed is:

1. An auxiliary brake light system for a vehicle, comprising:
   a left light module for being mounted on a back of the vehicle and having a right part extending upwards and a left part;
   a right light module for being mounted on the back of the vehicle and having a left part extending upwards and a right part; and
   a middle light bar for being mounted on the back of the vehicle above the left light module and the right light module and having a left part extending downwards and a right part extending downwards;
   wherein the left part of the middle light bar and the right part of the left light module are separated from each other and opposite to each other;
   the right part of the middle light bar and the left part of the right light module are separated from each other and opposite to each other;
   the middle light bar further has a middle part that is connected between a top of the left part of the middle light bar and a top of the right part of the middle light bar;
   the left part of the left light module and the right part of the right light module are mounted at a same height;
   the left part of the left light module is connected to a bottom of the right part of the left light module and parallel to the middle part of the middle light bar, and the right part of the right light module is connected to a bottom of the left part of the right light module and parallel to the middle part of the middle light bar;
   the left part of the middle light bar inclines straight to the right part of the left light module, and the right part of the middle light bar inclines straight to the left part of the right light module;
   a slope of the left part of the middle light bar is opposite to a slope of the right part of the middle light bar;
   the left light module further comprises a third part extending upwards;
   the left part of the left light module has a left terminal and a right terminal that are respectively connected to a bottom of the third part of the left light module and the bottom of the right part of the left light module;
   a slope of the third part of the left light module is opposite to a slope of the right part of the left light module;
   the right light module further comprises a third part extending upwards;
   the right part of the right light module has a right terminal and a left terminal that are respectively connected to a bottom of the third part of the right light module and the bottom of the left part of the right light module; and a slope of the third part of the right light module is opposite to a slope of the left part of the right light module.

2. The auxiliary brake light system as claimed in claim 1, wherein the left light module further comprises a fourth part extending downwards and a fifth part extending downwards;
the left terminal and the right terminal of the left part of the left light module are respectively connected to a top of the fourth part of the left light module and a top of the fifth part of the left light module;
a slope of the fourth part of the left light module is opposite to the slope of the third part of the left light module;
a slope of the fifth part is opposite to the slope of the right part of the left light module;
the right light module further comprises a fourth part extending downwards and a fifth part extending downwards;
the right terminal and the left terminal of the right part of the right light module are respectively connected to a top of the fourth part of the right light module and a top of the fifth part of the right light module;
a slope of the fourth part of the right light module is opposite to the slope of the third part of the right light module;
a slope of the fifth part of the right light module is opposite to the slope of the left part of the right light module.

3. An auxiliary brake light system for a vehicle, comprising:
a left light module for being mounted on a back of the vehicle and having a right part extending upwards and a left part;
a right light module for being mounted on the back of the vehicle and having a left part extending upwards and a right part; and
a middle light bar for being mounted on the back of the vehicle above the left light module and the right light module and having a left part extending downwards and a right part extending downwards;
wherein the left part of the middle light bar and the right part of the left light module are separated from each other and opposite to each other;
the right part of the middle light bar and the left part of the right light module are separated from each other and opposite to each other;
the middle light bar, the left light module, and the right light module are curved light bars;
the left part and the right part of the left light module extend upwards;
the left part and the right part of the right light module extend upwards;
the left part of the middle light bar and the right part of the left light module are opposite to each other along a first straight line;
the right part of the middle light bar and the left part of the right light module are opposite to each other along a second straight line; and
a slope of the first straight line is opposite to a slope of the second straight line.

4. An auxiliary brake light system for a vehicle, comprising:
a left light module for being mounted on a back of the vehicle and having a right part extending upwards and a left part;
a right light module for being mounted on the back of the vehicle and having a left part extending upwards and a right part; and
a middle light bar for being mounted on the back of the vehicle above the left light module and the right light module and having a left part extending downwards and a right part extending downwards;
wherein the left part of the middle light bar and the right part of the left light module are separated from each other and opposite to each other;
the right part of the middle light bar and the left part of the right light module are separated from each other and opposite to each other;
the middle light bar further has a middle part that is connected between a top of the left part of the middle light bar and a top of the right part of the middle light bar;
the left light module further comprises a middle part;
the middle part of the left light module has a left terminal and a right terminal that are respectively connected to a right terminal of the left part of the left light module and the bottom of the right part of the left light module;
a slope of the middle part of the left light module is opposite to the slope of the right part of the left light module;
the right light module further comprises a middle part;
the middle part of the right light module has a left terminal and a right terminal that are respectively connected to the bottom of the left part of the right light module and a left terminal of the right part of the right light terminal; and
a slope of the middle part of the right light module is opposite to the slope of the left part of the right light module.

5. An auxiliary brake light system for a vehicle, comprising:
a left light module for being mounted on a back of the vehicle and having a right part extending upwards and a left part;
a right light module for being mounted on the back of the vehicle and having a left part extending upwards and a right part; and
a middle light bar for being mounted on the back of the vehicle above the left light module and the right light module and having a left part extending downwards and a right part extending downwards;
wherein the left part of the middle light bar and the right part of the left light module are separated from each other and opposite to each other;
the right part of the middle light bar and the left part of the right light module are separated from each other and opposite to each other;
the middle light bar further has a middle part that is connected between a top of the left part of the middle light bar and a top of the right part of the middle light bar;
the left light module further comprises a seventh part extending downwards;
a top of the seventh part of the left light module is connected to a right terminal of the left part of the left light module;
a slope of the seventh part of the left light module is opposite to the slope of the right part of the left light module;
the right light module further comprises a seventh part extending downwards;

a top of the seventh part of the right light module is connected to a left terminal of the right part of the right light module; and a slope of the seventh part of the right light module is opposite to the slope of the left part of the right light module.

6. An auxiliary brake light system for a vehicle, comprising:

a left light module for being mounted on a back of the vehicle and having a right part extending upwards and a left part;

a right light module for being mounted on the back of the vehicle and having a left part extending upwards and a right part; and a middle light bar for being mounted on the back of the vehicle above the left light module and the right light module and having a left part extending downwards and a right part extending downwards;

wherein the left part of the middle light bar and the right part of the left light module are separated from each other and opposite to each other;

the right part of the middle light bar and the left part of the right light module are separated from each other and opposite to each other;

the middle light bar, the left light module, and the right light module are curved light bars;

the right part of the left light module and the left part of the right light module extend upwards;

a left terminal of the left part of the left light module extends laterally; and a right terminal of the right part of the right light module extends laterally.

* * * * *